United States Patent
Seth et al.

(10) Patent No.: US 8,924,437 B2
(45) Date of Patent: Dec. 30, 2014

(54) MEMORY USAGE DATA COLLECTION AND ANALYSIS FOR DYNAMIC OBJECTS

(75) Inventors: Gaurav Seth, Redmond, WA (US); Michael C. Fanning, Redmond, WA (US); Jennifer Hamilton, Seattle, WA (US); Curtis Man, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 13/418,343

(22) Filed: Mar. 13, 2012

(65) Prior Publication Data

US 2013/0246417 A1    Sep. 19, 2013

(51) Int. Cl.
   *G06F 17/30*    (2006.01)
(52) U.S. Cl.
   USPC .......................................... 707/813; 707/736
(58) Field of Classification Search
   CPC ........................ G06F 12/0253; G06F 12/0269
   USPC ........ 707/736, 813; 717/115; 712/1; 711/100
   See application file for complete search history.

(56) References Cited

U.S. PATENT DOCUMENTS

| | | | | |
|---|---|---|---|---|
| 6,167,535 | A * | 12/2000 | Foote et al. ................ | 714/38.11 |
| 7,325,106 | B1 | 1/2008 | Dmitriev et al. | |
| 7,472,132 | B2 | 12/2008 | Ho et al. | |
| 7,614,003 | B2 * | 11/2009 | Brichford et al. ............. | 715/760 |
| 8,468,502 | B2 * | 6/2013 | Lui et al. ...................... | 717/127 |
| 8,631,387 | B2 * | 1/2014 | Henderson .................... | 717/108 |
| 8,694,988 | B2 * | 4/2014 | Goldman ...................... | 717/174 |
| 2004/0181782 | A1 | 9/2004 | Findeisen | |
| 2011/0138367 | A1 | 6/2011 | Havin | |

OTHER PUBLICATIONS

"Finding Leaks in Ruby Apps with Eclipse Memory Analyzer", Retrieved at <<http://blog.headius.com/2010/07/finding-leaks-in-ruby-apps-with-eclipse.html>>, Jul. 12, 2010, pp. 13.

"Put JavaScript Memory under Control Using Chrome Developer Tools",Retrieved at <<http://www.ditii.com/2011/05/27/put-javascript-memory-under-control-using-chrome-developer-tools/ >>, May 27, 2011, pp. 6.

"Cocoa Fundamental Guide" , Retrieved at <<http://developer.apple.com/library/mac/#documentation/Cocoa/Conceptual/CocoaFundamentals/CocoaObjects/CocoaObjects.html>>, Dec. 13, 2010, pp. 239.

Kovacs, James, "Identify and Prevent Memory Leaks in Managed Code",Retrieved at <<http://msdn.microsoft.com/en-us/magazine/cc163491.aspx>>, Dec. 12, 2006, pp. 8.

"A re-introduction to JavaScript", Retrieved at <<https://developer.mozilla.org/en/A_re-introduction_to_JavaScript>>, Mar. 7, 2006, pp. 23.

(Continued)

*Primary Examiner* — Robert Beausoliel, Jr.
*Assistant Examiner* — Alexandria Bromell
(74) *Attorney, Agent, or Firm* — Kevin Sullivan; Kate Drakos; Micky Minhas (57) ABSTRACT

A script engine for a dynamic language can collect memory allocation information for dynamic objects created by the scripting engine and for dynamic objects created by the script engine host. A native interface can be exposed to a client comprising a software development tool. The software development tool can be a third-party tool. In response to a query, the script engine can take a snapshot of a garbage collector heap and return an object record for each dynamic object in the heap. The object information can include memory allocation information, object type and other information. Multiple snapshots can be taken and the delta between snapshots can be determined and sent to a requestor.

20 Claims, 5 Drawing Sheets

(56) References Cited

OTHER PUBLICATIONS

Burrowa, Chris, "New C# Features in the .NET Framework 4", Retrieved at <<http://msdn.microsoft.com/en-us/magazine/ff796223.aspx>>, Feb. 18, 2011, pp. 13.

Jump, Maria, "Cork: Dynamic Memory Leak Detection for Garbage-Collected Languages", Retrieved at <<http://citeseerx.ist.psu.edu/viewdoc/download?doi=10.1.1.66.1300&rep=rep1&type=pdf>>, Proceedings of ACM SIGPLAN Notices, v.42 n. 1, Jan. 17-19, 2007, pp. 31-38.

Maxwell, et al., "Diagnosing Memory Leaks using Graph Mining on Heap Dumps", Retrieved at <<http://www.cs.vt./edu/~ramakris/papers/ind748n-maxwellATS.pdf>>, Proceedings of 16th ACM SIGKDD international conference on Knowledge discovery and data mining, ser. KDD, Retrieved Date:Jul. 25-28, 2010, pp. 115-124.

Mitchell, et al., "LeakBot: An Automated and Lightweight Tool for Diagnosing Memory Leaks in Large Java Applications", Retrieved at <<http://domino.watson.ibm.com/comm/research_projects.nsf/pages/leakbot.pubs.html/$FILE/ecoop2003.pdf>>, Proceedings: 17th European Conf. on Object-Oriented Programming, Darmstadt, Germany, 2003, Retrieved Date: 2003, pp. 351-377.

\* cited by examiner

MEMORY USAGE DATA COLLECTION AND ANALYSIS FOR DYNAMIC OBJECTS

BACKGROUND

A dynamic programming language is one that at runtime executes behaviors that a static language typically either does not perform at all or performs during compilation. The behaviors executed at runtime by a dynamic language can include extension of the program by adding new code, extension of the program by extending objects and definitions, or by modifying the type system. In a dynamic programming language, information not available at compile time can significantly alter how the program executes. For example, in a static program, when a variable is declared in the source code, the declaration specifies the type of the variable: variable x is an integer, or variable x is a string, etc. If variable x is an integer, adding x to an integer constant will invoke an arithmetic add. If variable x is a string, adding x to a constant that is a string will invoke a concatenation of the constant and x. In a dynamic programming language, the type of the variable is not known until the program executes, so additional code paths are needed to handle the different types of add operations, adding overhead to program execution.

Examples of languages generally considered to be dynamic languages include but are not limited to: ActionScript, BASIC, BeanShell, ColdFusion. Common Lisp and some other Lisp languages, Groovy, E programming languages; JavaScript, VBScript, MATLAB, Lua, Objective-C, Perl, PHP, Powershell, Python, Ruby, Smalltalk, Tcl and Dolphin Smalltalk.

SUMMARY

Information concerning memory consumption patterns of an application written in a dynamic language and executed by one or more instances of a script engine running within a host can be collected. The collected information can be used to find memory leaks that occur over the lifetime of an application written in a dynamic language. The memory leaks can be caused by features of the dynamic language including but not limited to the use of circular references, closures and cross boundary references. A garbage collector of a dynamic language scripting engine can collect and/or analyze information about memory consumed by a script and can expose the collected/analyzed information to one or more tools such as software development tools. The collected/analyzed information can be used by user interfaces and tools to provide memory analysis of applications written in dynamic languages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

One aspect of an application's performance and reliability concerns its memory consumption. In dynamic languages including but not limited to JavaScript where concepts and patterns like scoping, circular references, closures and making cross boundary references between the engine and host objects are fairly common, applications can use more memory than intended, often by holding references to objects that are no longer needed by the application. Moreover, because of interactions between the script and the script engine host and because of the sharing of references within and across computer and process boundaries, memory leaks are common. Some performance problems that result in slow-downs can be caused by inefficient memory allocation patterns.

Collecting and analyzing memory consumption patterns of an application can detect memory leaks that can occur over the lifetime of an application. Memory leaks can degrade program and computer performance and can use up resources unnecessarily. Most memory analysis tools are directed to native code objects because the recycling of dynamic objects is left up to a garbage collector implemented by the scripting engine. A garbage collector reclaims memory used by objects when no references to an object remain. The efficiency of garbage collection for some dynamic languages is hindered by interactions between a script engine host's memory manager and a scripting language's garbage collector, and can result in memory leaks.

Memory leaks can also be caused by usage of language features including but not limited to scoping, circular references, closures and cross-boundary references. The subject matter described herein addresses these conditions and others by collecting and saving static memory allocation information (data) at a particular point in time during execution of the program, rather than saving a pointer to dynamic (changing) memory elements. The information can be collected by taking one or more snapshots of script objects created by a script code, however, the information collected can include any description of memory elements at some particular point in time. The memory elements can be objects. The objects can be generated and/or maintained by multiple instances of a script engine that are running within a single host. Metadata associated with an object record created from the object can identify a runtime context (such as but not limited to an associated script engine or web worker). A memory element such as a memory object can be a variable, a function, an array, a literal, any host object (including but not limited to a DOM element, a wrapper object around interop structures such as ActiveX object instances, embedded media, etc). A host of the one or more script engines can render a DOM that aggregates multiple documents (e.g., by means of <frame> elements) avoiding potential security exceptions.

The information can be collected from a data structure such as but not limited to a data structure maintained by the script engine's garbage collector. The collected information can include the object's name, size, identifier (which can be based on the address of the object or can be an assigned sequential number or can be based on another suitable paradigm), references to and from the element, scope chains and other information, described more fully below. References to and from the object can be represented as properties of the object. References to and from the object can be represented as relationships of the object. A reference can be a name property on the object, a series of index properties associated with the object (e.g., elements within an array), a reachable object associated with a function scope chain or scope, a prototype object, an internal property (for example, when one object acts as a wrapper on another object), a relationship that a DOM object can have, such as a relationship to a sub-object, or a fan-in reference to an object. A fan-in reference is a reference to an object that itself references the object described in the current record. This functionality can be natively integrated with the dynamic script engine's script engine host, enabling memory allocation information to be provided for host objects or for elements created by the script code.

An object record for each object in the collected information can be created. An object record can be created for a live object. An object record can be created for a de-allocated object. Metadata can be associated with the object record to indicate that the object is a de-allocated object. Metadata can be associated with the object record to indicate that the object is a live object. Creation of object records for both live and de-allocated objects enables the history of allocation and de-allocation between two points in time to be tracked and profiled. Memory size information, both for the object and for the object tree can be provided. An object tree can include the object, and the properties associated with the object and each of its properties.

Memory size consumed by an object can be provided, whether the memory is allocated in the engine's garbage collector, system heap, or on the script engine host. For foreign objects, the script engine host may perform this reporting for objects native to the DOM (such as, for example, <img> element data size). For some classes of foreign object (that may be directly callable by the engine), the host script engine may report object metrics and collecting data directly from the objects themselves. Comparisons between snapshots of object graphs can be made to determine differences between snapshots taken over time, enabling external tools and other programs to read a memory dump from the script engine and recreate the entire or partial object graphs in a separate thread or process. A unique identifier can be assigned to each object. The unique identifier may be created from an object's address or by generating some other identifier that is unique to the snapshot or other static data representation or unique across all snapshots, etc. (by using a simple counter, for example, that increments whenever an object instance is included within an enumeration for the first time). A pointer to the live object that can be dereferenced by the consumer may be provided in the object record. Information that tracks whether an object was present in a previous snapshot can be obtained and provided.

The differences of references to and from the object, including properties and scope chains can be determined. Scope chain information associated with objects can be maintained and reported with each snapshot. Memory diagnostic functionality can be provided without executing the script engine in a debug or diagnostic mode, so that performance of the script execution is not degraded. Objects can be sorted by allocation source. A line of source code responsible for those allocations can be determined. A complete stack associated with the memory allocation can also be provided.

It will be appreciated that although described in the context of a pull model, the above can also be implemented as a push model, as for example, an event-driven model. In a push model embodiment, the script engine memory allocator and garbage collector may work in concert to maintain a data structure that tracks the current objects in memory. Records for collected and/or de-allocated objects can be preserved. This information can be "pushed" to consumers who have indicated an interest in the data. Consumers can indicate an interest in the data by subscribing to an event or making a request and providing a pointer to a callback to receive the data. The memory allocator and garbage collector may only maintain and publish this data in conditions where one or more requests have been made to receive it.

Memory Usage Data Collection and Analysis for Dynamic Objects

Figure 1A:
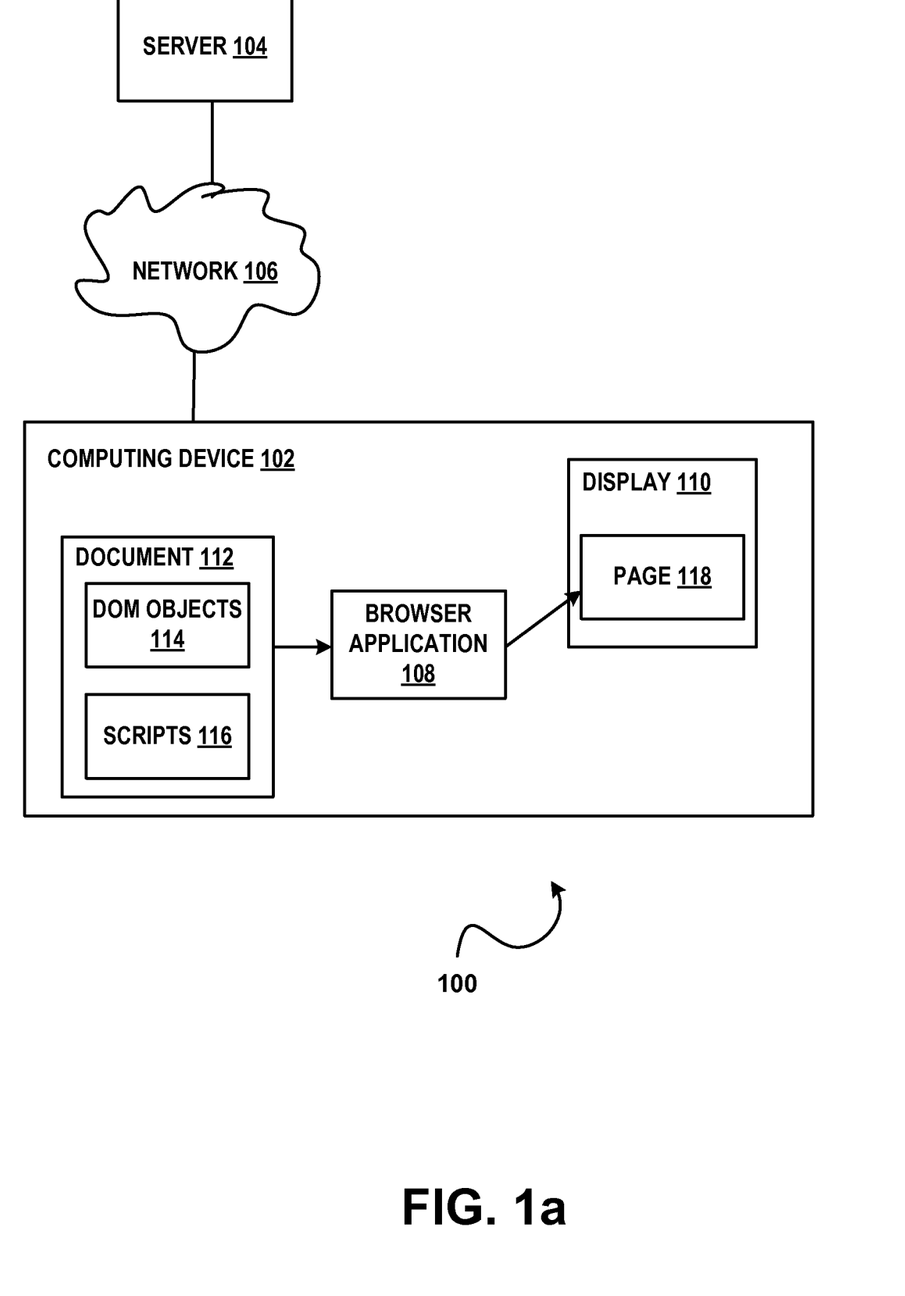
FIG. 1a illustrates an example of a system 100 that includes a browser application configured to render pages from received documents in accordance with aspects of the subject matter disclosed herein.

FIG. 1a illustrates a web browsing environment 100, in accordance with some aspects of the subject matter disclosed herein. As shown in FIG. 1a, environment 100 can include one or more of: a computing device 102, a server 104, a network 106 and a browser application 108. Web browsing environment 100 may include other components known in the arts.

Computing device 102 can be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 can be communicatively coupled by network 106. Network 106 can include one or more communication links and/or communication networks, such as a PAN (personal area network), a LAN (local area network), a WAN (wide area network), or a combination of networks, such as the Internet. Computing device 102 and server 104 may be communicatively coupled to network 106 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Browser application 108 can be a program that can execute on computing device 102 and represents one type of host. Browser application 108 can enable network information resources to be retrieved, presented, and traversed. An information resource or object can be retrieved by browser application 108 using a network address, such as a uniform resource identifier (URI). Examples of information resources include web pages, images, videos, and other forms of content. Hyperlinks that are present in information resources enable users easily to navigate their browsers to related resources. Examples of browser application 108 include Internet Explorer®, developed by Microsoft Corp. of Redmond, Wash., Mozilla Firefox®, developed by Mozilla Corp.

of Mountain View, Calif., Safari®, developed by Apple Inc. of Cupertino, Calif., and Google® Chrome of Mountain View, Calif.

Browser application 108 can retrieve a document 112 from a server 104 through network 106. Document 112 can be saved and subsequently retrieved from computing device 102. Document 112 can be a web document that includes code of a markup language, such as Hyper Text Markup Language (HTML), dynamic HTML (DHTML), extensible HTML (XHTML), extensible markup language (XML), etc. Document 112 can include DOM (document object model) objects 114 and one or more scripts 116. DOM objects 114 can include one or more objects represented in document 112 according to the DOM convention, which is a cross-platform and language-independent convention for representing and interacting with objects. DOM objects 114 may include objects that are directly included in document 112, and/or are referenced by document 112 and separately retrieved from server 104 or other server. Script(s) 116 include code formatted according to a dynamic language (e.g., JavaScript, VBScript, AJAX, Python, Perl, etc.) that enables changes to be made to DOM objects 114, including changes based on factors such as user input, environmental conditions (e.g., the time of day, or other variables), etc. The code of script(s) 116 can access and modify objects of DOM objects 114 on the fly without returning to server 104.

Browser application 108 can receive (e.g., load) document 112. Browser application 108 can include a browser engine (e.g., a layout engine or rendering engine) that formats information of document 112, and displays the formatted information. For example, as shown in FIG. 1a, browser application 108 can generate a page 118 based on document 112 that is displayed by a display 110 of computing device 102. Browser application 108 can be configured to execute one or more scripts 116 that are embedded in document 112, or separate from but associated with document 112.

Figure 1B:
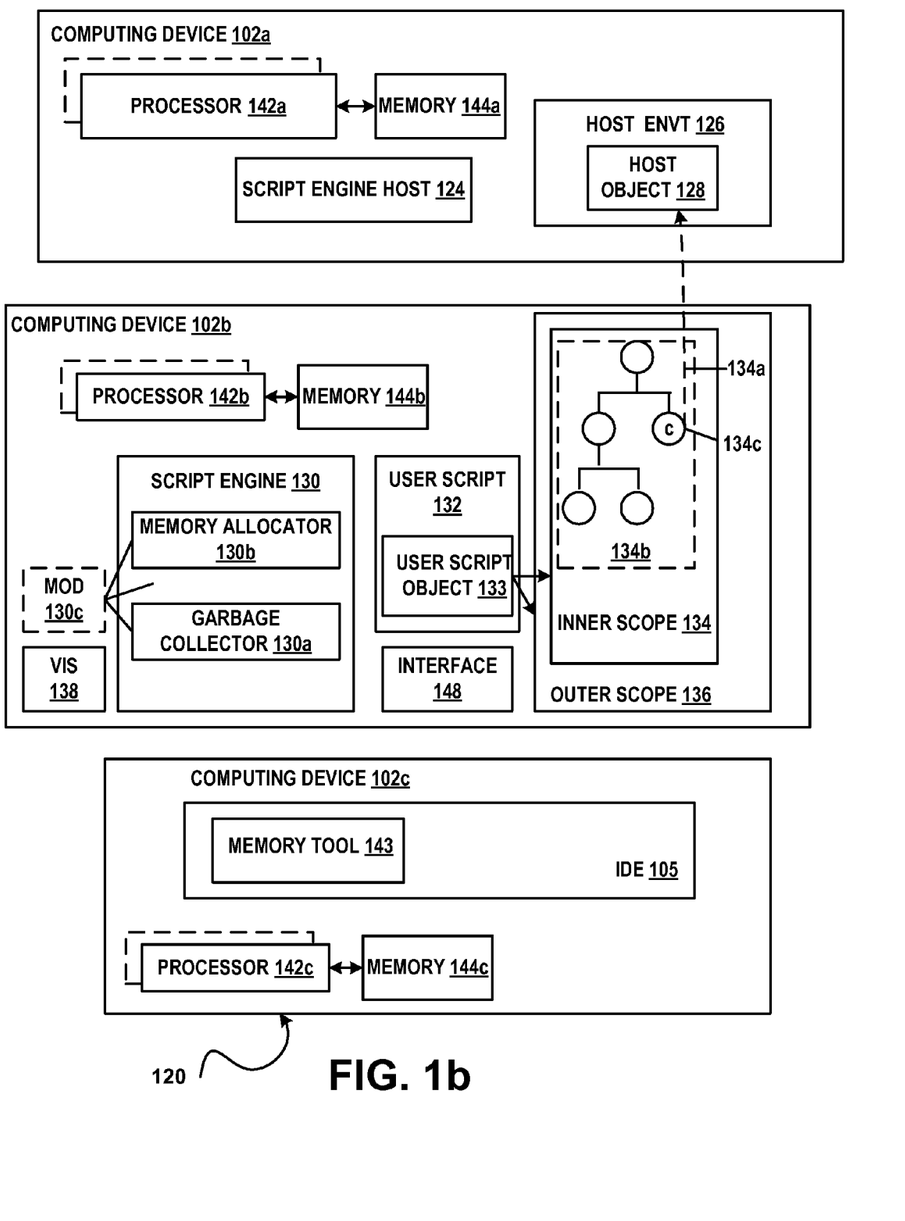
FIG. 1b illustrates an example of a system 120 that collects memory consumption usage information in accordance with aspects of the subject matter disclosed herein.

FIG. 1b illustrates a block diagram of a system 120 that collects and analyzes memory usage of a program written in a dynamic scripting language. The collected and/or analyzed information can be provided to a software development tool or other program. All or portions of system 120 may reside on one or more computers such as the computers described below with respect to FIG. 3. System 120 or portions thereof may be provided as a stand-alone system or as a plug-in or add-in. System 120 may execute on a software development computer such as the software development computer described with respect to FIG. 4. All or portions of system 120 may execute within an integrated development environment (IDE) such as for example, IDE 105, described more fully with respect to FIG. 4 or can execute outside an IDE. All or portions of system 120 may be implemented as a plug-in or add-on.

System 120 may include one or more computing devices or computers such as computer 102a providing a hosting environment for one or more script engines. A script engine can execute a program written in a dynamic scripting language. Computer 102a can include one or more processors such as processor 142a, etc., a memory such as memory 144a, and one or more modules comprising a script engine host such as script engine host 124. It will be appreciated that one or more modules such as script engine host 124, etc. can be loaded into memory 144a to cause one or more processors such as processor 142a, etc. to perform the actions attributed to the script engine host 124. Script engine host 124 can be a browser such as any of the browsers mentioned above. The script engine host 124 can be a component of the operating system (e.g., Microsoft Corporation's Windows Web Applications®, etc.).

Script engine host 124 can be associated with a host environment, illustrated in FIG. 1b as host environment 126. Each host object (such as host object 128) in the host environment 126 can be associated with a corresponding host scope. Multiple instances of a script engine can run within a single host.

System 120 may include another computer or computing device such as computer 102b including one or more processors such as processor 142b, etc., a memory such as memory 144b, and one or more modules comprising a script engine such as script engine 130. Script engine 130 may include a garbage collector such as garbage collector 130a. Script engine 130 may include a memory allocator such as memory allocator 130b. One or more modules such as module 130c can reside within or be associated with script engine 130, garbage collector 130a or memory allocator 130b or any combination thereof. One or more modules such as module 130c can exist outside the script engine, memory allocator and/or garbage collector. The one or more modules represented by module 130c can collect and persist static memory allocation information as described more fully below. It will be appreciated that module 130c can be loaded into memory 144b to cause one or more processors such as processor 142b, etc. to perform the actions attributed to module 130c. Script engine 130 can execute a user script such as user script 132. The script language of the user script can be a dynamic scripting language such as but not limited to JavaScript.

A user program such as user script 132 written in JavaScript or any known or future dynamic scripting language can be executed by the script engine 130. User script 132 may include one or more user script objects such as user script object 133. A user script object such as user script object 133 can be represented as a tree comprising one or more nodes or as a graph of a collection of elements including objects, elements of objects, and/or references to objects or elements of objects. Elements of an object can represent properties of the object. References may be references to other objects or nodes within an object or other objects can reference user script object 133 or nodes within user script object 133.

A user script object such as user script object 133 can be associated with one or more scopes such as but not limited to a global scope, function scope and so on. Each object can be associated with one or more outer scopes. Each object can be associated with one or more inner scopes. Each node in the tree representing an object can be associated with one or more scopes. Each node in the tree can reference one or more host objects. In FIG. 1b, user script object 133 represented by tree 134b is associated with an outer scope 136 and an inner scope 134. In computer programming, a scope is the context within which a variable name or identifier identifies the variable, or within which a declaration of a variable has effect. Scoping keeps variables in different parts of a program distinct from each other so that for example, a variable in one scope is not reachable from program code that executes in an unrelated scope.

Different programming languages have different rules for scoping. In JavaScript, a scope is associated with all function executions and holds the variables and their associated values within the function. A JavaScript variable is in the scope of the code that declared the variable, and is in the scope of any functions nested within the code that declared the variable. The scope cannot be directly accessed from the JavaScript code. In accordance with some aspects of the subject matter described herein, a scope object can be created to hold scope information. Scope objects are not garbage collected until no more references back to the scope object or its result exist. Scope objects form a chain called the scope chain. A JavaScript function has an associated scope chain that defines the variables that are in the scope of the function. The combination of a JavaScript function and its associated scope chain is called the closure for that function.

An element of a user script object can be a reference to another object or can be a reference to an element of another object. An element of a user script object can reference an object or an element of an object in a different scope. For example, in FIG. 1*b* an element of user script object 133 references a host object 128 in the host environment 126. Node c 134*c* of tree 134*b* representing user script object 133 is shown as having a reference 134*a* to a host object 128 in host environment 126.

As stated above, script engine 130 can include a garbage collector 130*a* and a memory allocator 130*b*. Memory allocator 130*b* can allocate memory for objects. The garbage collector 130*a* can de-allocate and track memory usage for both JavaScript objects and host objects (dynamic language engine host objects). The garbage collector 130*a* can store information associated with dynamic object memory allocations on a garbage collector data structure such as but not limited to a heap or a stack. A program module 130*c* can be external to a script engine or can be a part of or associated with the script engine 130, or the garbage collector 130*a* or the memory allocator 13*b* or any combination thereof. Program module 130*c* can provide a tool with the ability to access contents of the garbage collector data structure at any point in time.

The information can be captured on demand as the result of a request from a requestor. A request made by a requestor can define or qualify the information requested. For example, the requestor can ask for only records that are associated with a particular instance of the script engine. The request can be configured to aggregate size information for graph nodes and so on. The collected memory usage information can be maintained incidentally as part of the standard memory management (i.e., allocation and de-allocation) provided by the runtime. The information collected can be associated with an enumerator. At the point that the collected information is associated with an enumerator, it becomes a static construct that is not modified further. In cases where the runtime maintains a current snapshot of the system, a new data structure can be created and maintained after handing off a previous snapshot as the result of responding to an external request for it. In cases where collected memory allocation and/or de-allocation information is pushed to code that has subscribed to an event or provided a callback to be invoked at well-determined times (such as on every occurrence of a garbage collection), module 130*c* can provide this information by giving a requestor a reference to the current garbage collector data structure and then starting a new garbage collector data structure so that the referenced data structure does not change.

The module 130*c* can provide memory allocation and/or de-allocation information by taking a snapshot. The module 130*c* can create a new data structure based on the garbage collector data structure. However captured, the information can include what objects are alive at the point in time at which the request was acted upon. The captured information can include information concerning de-allocated objects. The captured information can include any stacks associated with the objects in the garbage collector's data structure. For each object present in the garbage collector data structure at the time the request was received, information such as the name of the object, the size of the object, the address, references to and from the object and scopes information for the object can be collected and persisted. Information including the name of the object, the size of the object, the address and the references to and from the object, information concerning the scopes of the object, can also be collected and persisted for a host object. Collection of host object information can avoid a need for a tool to access the script engine host. Instead the tool can receive host object information from the script engine or a component thereof. Information including allocation information including associated stacks, size information of: an object, a collection of objects including DOM objects constructed or managed by the host, a node in the object, a collection of nodes in the object, etc. can be provided by the script engine. A graph of JavaScript objects or a combination of JavaScript and host objects can be provided.

As described above, at any point in time during execution of a program written in a dynamic scripting language, a snapshot can be taken that can provide information associated with live and/or de-allocated objects at that point in time. In accordance with aspects of the subject matter described herein, two or more snapshot can be taken to provide one or more deltas of live and/or de-allocated objects over time. By creating a series of snapshots and determining deltas between snapshots a record of the activities with respect to the objects allocated by the program as the program executes can be determined. For example, it can be determined that a particular object existing when a first snapshot was taken is no longer alive at the time a second snapshot was taken. A memory graph can be processed to create a series of object records that describe events that occurred over time with respect to memory allocation, including de-allocation events. The object graph can be recreated in a separate set of processes.

Differences between snapshots can be determined to show memory consumption patterns over time, object size over time, use of host objects over time, use of JavaScript objects over time, different scopes over time and so on. A unique identifier for the object or graph can be provided. The unique identifier for the object can be based on the address of the object in the garbage collector heap. A flag can be used to indicate if an object at a particular address in one snapshot is the same object as the object at that address in a second snapshot. The flag can be a one-bit flag. The flag can be metadata indicating prior enumeration (e.g., the object appeared in a previous information capture).

The memory diagnostic capability described herein can operate without the script engine 130 being placed in a debug or diagnostic mode, thus avoiding possible performance ramifications and other unwanted effects. For example, object construction patterns may differ between debug and non-debug modes. For example, a particular API and its associated object allocations may only be available when the runtime is in debug mode. In other cases, runtime performance optimizations in the memory allocator and/or garbage collector may be disabled in debug mode, altering the object construction/collection pattern.

Module 130*c* can provide this information natively by exposing a native code interface such as a COM based interface that can be used by one or more tools to request a memory snapshot from the script engine at a selected point during the lifetime of an application. Methods of the script engine accessible via the COM interface include a method that obtains a count of live object records (e.g., GetCount), a method that returns an object record for each object in the garbage collector data structure, (e.g., Next), a method that skips an object record (e.g., Skip), a method that resets the enumerator (e.g., iterator) associated with the memory allocation information collection to the beginning of the data structure (e.g., Reset).

As stated above, each object can include a flag that can be used to indicate if the object was seen when the previous snapshot was taken. This information in combination with the memory address can allow a tool or client process to uniquely identify objects without adding overhead to each object in the garbage collector's data structure. Each object record can include the type of the object. Type information can include the type of the native JavaScript/host object, and/or whether the object is pinned or is not pinned. A pinned object (whether host object or script object) is an object that is referenced by an external object and can be kept alive till the external object is alive. The object record can indicate that the object is a Scope Object (a representation of a particular object graph that corresponds to the environmental scope of the object and needs to be kept alive while any object in that scope is alive).

One object can be associated with multiple scope objects. Each scope can be associated with more than one object. The object record can indicate that the object refers to a closed script site. The object record can indicate that the object is a foreign object that is instantiated by the script engine host. A foreign object can be a type including but not limited to ActiveX and WINRT-type objects. A WINRT object is a foreign object that refers to a piece of functionality that is provided by the operating system itself, rather than being provided by the dynamic language environment or the dynamic language host (e.g., the browser). A foreign object can include any covering object or data that wraps and/or interoperates with OS API/data.

A visualization 138 of the object record or of a collection of object records can be displayed on a display device associated with the computer. A visualization 138 of the garbage collector data structure can be generated from the collection of objects records. The object records can be enumerated over to produce a graph that displays connections between object records. The graph can be displayed or persisted to produce a report. The object records can be post-processed to produce reports that provide statistics and metrics of memory allocation information. The reports can include information concerning closures, the number of objects of each type, a count of bytes allocated by type, a count of object allocations associated with unique stacks. Long-lived objects can be flagged. Metrics around objects that survive multiple garbage collections can be returned. Such visualizations can indirectly point to potential memory leaks.

System 120 may include another computer or computing device such as computer 102c including one or more processors such as processor 142c, etc., a memory such as memory 144c, and one or more modules comprising a dynamic object memory usage tool such as memory tool 143. It will be appreciated that one or more modules such as a memory tool 143, etc. can be loaded into memory 144c to cause one or more processors such as processor 142c, etc. to perform the actions attributed to the memory tool 143. Memory tool 143 can interact with the module 130c to abstract information about the semantics of the program (e.g., user script 132) and the objects (e.g., user script object 133, etc.) that are being created. In particular memory tool 143 can receive information concerning memory usage patterns, objects created, the scopes of the objects such as inner scope 134 and outer scope 136 and so on. The memory tool can query an interface such as interface 148. The memory tool such as memory tool 143 can call a native iterator exposed by interface 148. The memory tool can request zero, one or all of the objects that have been garbage collected enabling the tool some level of control with respect to controlling memory consumption during iterations (i.e., tool manages buffer lifetime, whether stack or heap allocated). The script engine host 124, script engine 130 and memory tool 143 may all be running on the same computer or can run on two or more computers. Other components well known in the arts may also be included in system 120 but are not here shown.

Figure 2:
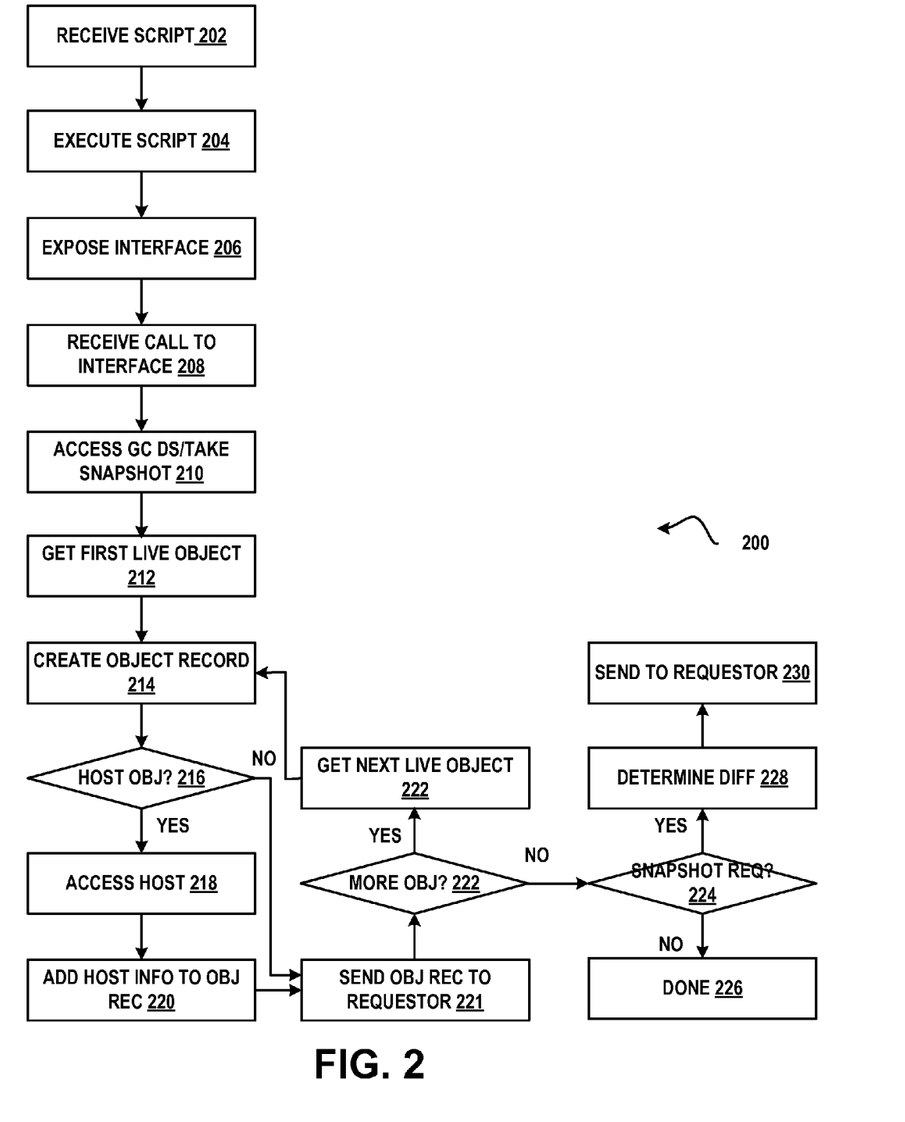
FIG. 2 illustrates an example of a method 200 for collecting and analyzing memory consumption usage patterns in accordance with aspects of the subject matter disclosed herein.

FIG. 2 illustrates a method 200 that can collect and analyze memory consumption information in accordance with aspects of the subject matter disclosed herein. The method described in FIG. 2 can be practiced by a system such as but not limited to the one described with respect to FIGS. 1a and 1b. While method 200 describes a series of acts that are performed in a sequence, it is to be understood that method 200 is not limited by the order of the sequence. For instance, some acts may occur in a different order than that described. In addition, an act may occur concurrently with another act. In some instances, not all acts may be performed.

At 202 a user script can be received. The user script can be a script written in a dynamic scripting language such as JavaScript, Python, Ruby, or in any language that creates dynamic objects. At 204 execution of the user script can begin in the script engine. The script engine can be a script engine as described more fully above. At 206 the script engine can expose a native code interface such as a COM based interface. Because the interface is supported natively, tools including third party tools can access the script engine without writing a script. At 208 the script engine can receive a call to the interface.

Tools that access the interface can invoke an enumerator such as an iterator via the interface. The iterator can enumerate through the garbage collector's data structure (e.g., a heap or a stack) and can determine how many objects are in the garbage collector data structure. The iterator can determine information about the objects. A table accessed by the methods of the interface and maintained by the script engine can include internal data, objects that the program has created and that the garbage collector has allocated memory for, and a mirrored reflection of host objects. Using the interface provided by the script engine, objects in the garbage collector's data structure can be skipped using a skip method, the enumerator can be reset to the beginning, a property map can be obtained and so on. A method that returns all the property identifier in a map that maps between type representations in the script engine to type representations in the requestor, enabling a tool to produce desired views of the data.

At 210, the garbage collector data structure can be accessed and in accordance with some aspects of the subject matter described herein, a snapshot can be taken of the data structure. The snapshot can include information comprising memory usage, the name, size, address of, references to and references from objects that have been allocated by the garbage collector by looking at the garbage collector heap. Alternatively, another data structure can be created as described more fully above. At 212 the first object in the data structure can be accessed.

At 214 an object record can be created for the object. The object record can include data such as but not limited to: a set of values for the object including but not limited to a name of the object, size of the object, references to other elements and references to the object, what scope the object is derived from, the scope chains with which the object is associated, the type of the object, and object allocation information. Object types supported by the script engine can be coded to indicate type. Coded types can include but is not limited to the following: JavaScript primitives (number, Boolean, string), built-in object types, values that mean particular things in terms of the language, e.g., undefined and null objects, host and foreign objects, DOM objects and ActiveX objects. The object record can also indicate if the object is pinned. A pinned object has to be kept alive until a reference to it exists.

At 216, it can be determined if the object is a host object or if the object is not a host object. In response to determining that the object is a host object, the script engine host can be accessed at 218. At 220 information available at the script engine host can be added to the object record. At 221 the object record can be sent to the requestor. In response to determining that the object is not a host object at 216, the object record can be sent to the requestor at 221. In response to determining that there are more objects in the garbage collector data structure at 222, the next live object in the data structure can be accessed and processing can continue at 214. This processing path can be repeated multiple times. In response to determining that there are no more objects in the data structure at 222, (e.g., using a "next" method that can return an object record for each object in the garbage collector heap) processing can continue at 224. If no additional requests for snapshots are received, the process can end at 226. If an additional request for a snapshot is received at 224, a differencing process can commence at 228. At 230, the results of the differencing operation can be sent to the requestor. Alternatively, the differencing operation can be performed by the requestor.

Example of a Suitable Computing Environment

Figure 3:
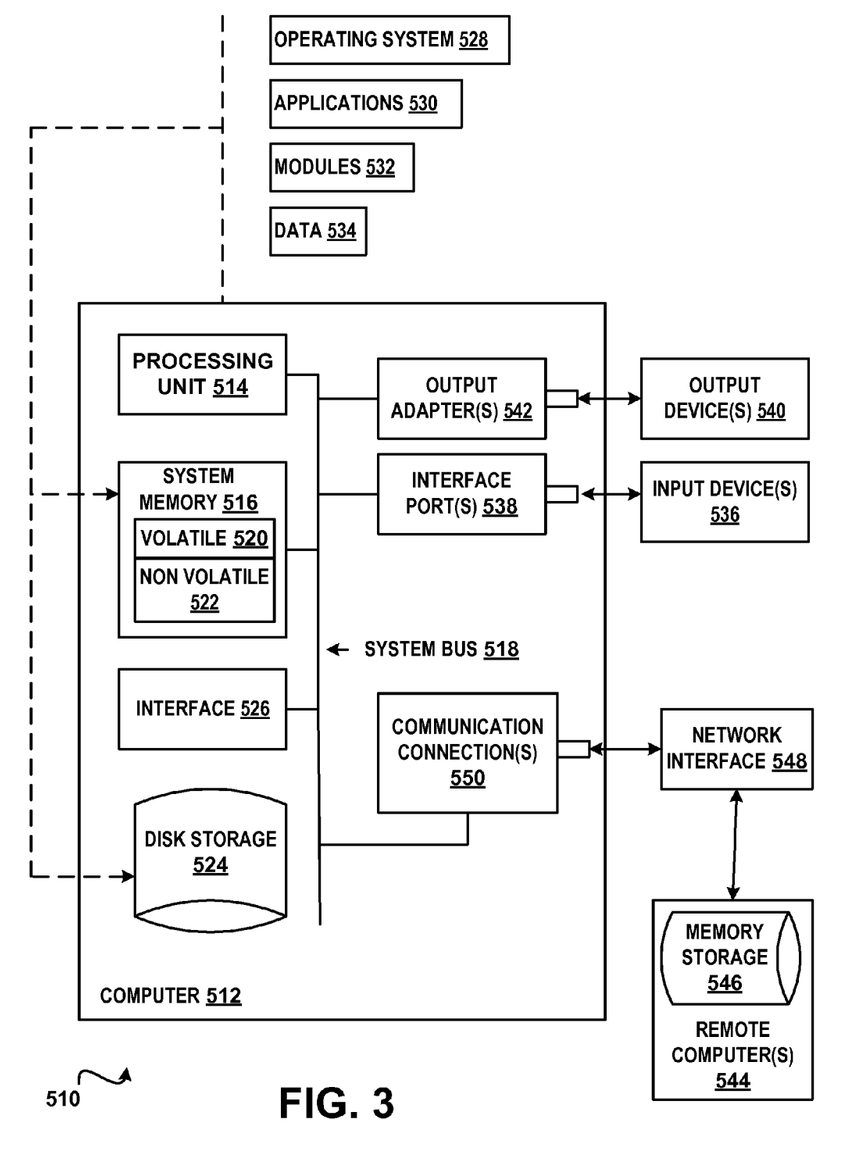
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory.

The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
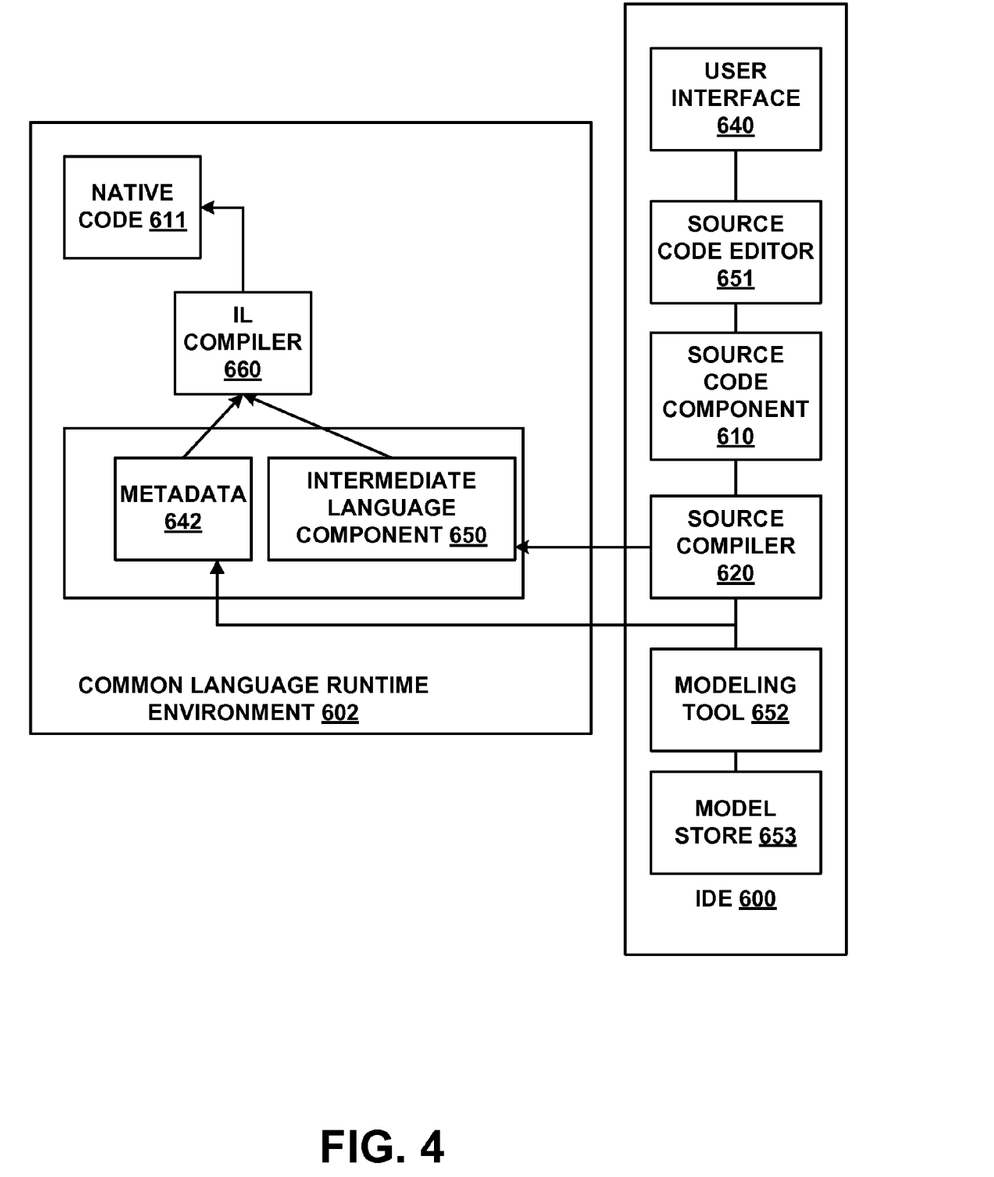
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   expose a native code interface;
   in response to invocation of the native code interface by a requestor, collect memory allocation information from a data structure maintained by at least one script engine;
   create an object record for at least one dynamic object in the collected memory allocation information, the object record comprising memory allocation information for the at least one dynamic object;
   in response to determining that the at least one dynamic object is an engine host object, obtain memory allocation information from a script engine host of the at least one script engine for the engine host object; and
   return the object record to the requestor.

2. The system of claim 1, further comprising at least one module that when loaded into the memory causes the at least one processor to determine:
   a name of the at least one dynamic object, a size of the at least one dynamic object, an identifier of the at least one dynamic object, or references from the at least one dynamic object.

3. The system of claim 1, further comprising at least one module that when loaded into the memory causes the at least one processor to provide:
   memory allocation information for the at least one dynamic object, the at least one dynamic object comprising a de-allocated object.

4. The system of claim 1, further comprising at least one module that when loaded into the memory causes the at least one processor to provide:
   associate an enumerator with the collected memory allocation information.

5. The system of claim 1, further comprising at least one module that when loaded into the memory causes the at least one processor to provide:
- a delta over time between a first collection of memory allocation information and a second collection of memory allocation information.

6. The system of claim 1, further comprising at least one module that when loaded into the memory causes the at least one processor to provide:
- a unique identifier for the at least one live dynamic, the unique identifier comprising metadata indicating prior enumeration.

7. The system of claim 1, further comprising at least one module that when loaded into the memory causes the at least one processor to:
- in response to determining that the at least one dynamic object is a function object, provide scope chain information for the function object.

8. The system of claim 1, wherein the object record comprises a stack of an allocation associated with allocation of the at least one dynamic object.

9. The method of claim 8, further comprising:
- performing the method of claim 8 in a non-diagnostic execution mode.

10. A method comprising:
- collecting memory allocation information for at least one dynamic object from a data structure maintained by a garbage collector of a script engine executing on a computer;
- making the collected memory allocation information static;
- creating an object record for the at least one dynamic object, the object record comprising a type of the at least one dynamic object; and
- sending the object record to a requestor.

11. The method of claim 10, further comprising:
- setting a flag in the object record of the at least one dynamic object, the flag indicating that the at least one dynamic object is a previously enumerated object.

12. The method of claim 10, further comprising:
- determining memory size information for an object tree comprising references, the object tree associated with the at least one dynamic object.

13. The method of claim 10, wherein the at least one dynamic object is a de-allocated object.

14. The method of claim 10, wherein the object record comprises a stack of an allocation associated with allocation of the at least one dynamic object.

15. A non-transitory computer-readable storage medium comprising computer-executable instructions which when executed cause at least one processor of a computing device to:
- expose a native code interface of a script engine for a dynamic language to a client executing a script on the script engine;
- in response to receiving from the client a query for memory allocation information for at least one dynamic object stored in a data structure maintained by a garbage collector of the script engine, take at least one snapshot of the data structure at a point in time during execution of the script;
- create an object record for at least one dynamic object in the data structure from the at least one snapshot, the object record comprising memory allocation information for the at least one dynamic object; and
- send the object record to the client.

16. The non-transitory computer-readable storage medium of claim 15, comprising further computer-executable instructions, which when executed cause the at least one processor to:
- take at least one additional snapshot of the data structure maintained by the garbage collector of the script engine at an additional point in time during execution of the script.

17. The non-transitory computer-readable storage medium of claim 16, comprising further computer-executable instructions, which when executed cause the at least one processor to:
- create an object record for the at least one dynamic object, the at least one dynamic object comprising a de-allocated object.

18. The non-transitory computer-readable storage medium of claim 17, comprising further computer-executable instructions, which when executed cause the at least one processor to:
- in response to determining that the at least one dynamic object is an engine host object, obtain memory allocation information from a script engine host for the engine host object.

19. The non-transitory computer-readable storage medium of claim 17, comprising further computer-executable instructions, which when executed cause at least one processor to:
- create the object record comprising a stack of an allocation associated with allocation of the at least one dynamic object.

20. The non-transitory computer-readable storage medium of claim 15, comprising further computer-executable instructions, which when executed cause at least one processor to:
- create the object record in a non-diagnostic execution mode.

* * * * *